United States Patent
Scialpi et al.

(10) Patent No.: US 9,754,324 B1
(45) Date of Patent: Sep. 5, 2017

(54) METHODS AND SYSTEMS FOR ASSESSING COMPARATIVE NEGLIGENCE

(71) Applicant: United Services Automobile Association (USAA), San Antonio, TX (US)

(72) Inventors: Emilee Scialpi, San Antonio, TX (US); Lorraine P. Castillo, San Antonio, TX (US); Erin Thiele, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 14 days.

(21) Appl. No.: 14/182,455

(22) Filed: Feb. 18, 2014

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ............ G06Q 40/08; G06Q 40/025
USPC ........................... 705/4, 35, 3, 38
See application file for complete search history.

(56) References Cited

U.S. PATENT DOCUMENTS

| | | | |
|---|---|---|---|
| 7,359,821 B1 | 4/2008 | Smith et al. | |
| 7,698,086 B2 | 4/2010 | Kidd et al. | |
| 7,702,528 B2 | 4/2010 | Wahlbin et al. | |
| 7,885,829 B2 | 2/2011 | Danico et al. | |
| 8,239,220 B2 | 8/2012 | Kidd et al. | |
| 2004/0030587 A1* | 2/2004 | Danico et al. | 705/4 |
| 2004/0054558 A1* | 3/2004 | Wahlbin et al. | 705/4 |
| 2004/0054559 A1* | 3/2004 | Wahlbin et al. | 705/4 |
| 2009/0234678 A1 | 9/2009 | Arenas | |
| 2012/0116819 A1 | 5/2012 | Hertenstein | |
| 2013/0041693 A1* | 2/2013 | Thomas et al. | 705/4 |

* cited by examiner

*Primary Examiner* — Lalita M Hamilton
(74) *Attorney, Agent, or Firm* — Perkins Coie LLP

(57) ABSTRACT

Methods and systems for assessing comparative negligence and training adjustors to assess comparative negligence are described. In some embodiments, a method includes receiving information relating to a collision involving two or more vehicles. The information may include a type of accident. A claims adjustor may provide an initial negligence allocation between an insured vehicle and a claimant vehicle. Based on the received information and the initial negligence allocation, questions may be dynamically generated. The questions may be used by the claims adjustor to reevaluate the initial negligence allocation. A finalized negligence allocation between the insured vehicle and the claimant vehicle may be received.

20 Claims, 10 Drawing Sheets

Auto Loss

There are no active policies for the given date of loss.

Reported by: [Claimant ▸] (MANDATORY)

Prefix: [ ]
First: [CYNTHIA]
Middle: [ ]
Last: [ALESTOCK]
Suffix: [--- Select --- ▸]

Type of Loss: [Collision ▸] (MANDATORY)

Initial loss description: [cv entered intersection on green light, iv suddenly in front of cv, impact]
46 characters left Was anyone injured? ○ Yes ◉ No Date of Loss: [03/19/2008] 📅 (MANDATORY)
MM/DD/YYYY
☐ Actual date of loss is unknown

Involving

Insured vehicle: ○ Vehicle not listed (new, substitute or non owned)

Claimant vehicles: [1 ▸] (If more than 5 vehicles, add vehicles using the Summary page)

Take Recording >>

When and Where | Claimant | Loss Details

Toolbars ▷
Loss Summary
Date of loss is more than 45 days ago
When and Where
Reported by: CYNTHIA ALESTOCK (Claimant Reporting person)
Type of Loss: Collision ▾ (MANDATORY)
Accident Description: Failure to yield right of way ▾ (MANDATORY)
When: 03/19/2008 📅 (MANDATORY)
        MM/DD/YYYY
        ☐ Actual date of loss is unknown
Time: 11 : 00 ○ AM ● PM
Type: ● Domestic ○ International
Address Line 1: _____ (MANDATORY)
Address Line 2: _____
City: WILMINGTON (MANDATORY)
State: Delaware
ZIP/Postal Code: ____
Country: United States
Location description, if  intersection of first ◂ ▸
address unknown:     and washington
83 characters left
(e.g. name of establishment, mile marker number)
✓Next  ✎Go To Summary  ●Exit

• "Take Recording" button is grayed out until "Accident Description" is selected for any Type of Loss = "Collisions"

| Auto Loss | |
|---|---|
| Loss Details | |
| Loss Statement | CYNTHIA ALESTOCK (Claimant Reporting person, |
| Given by: | Claimant Vehicle Owner) |
| 06/24/13 01:59 PM CST | COLL | cv entered intersection on green light, iv suddenly in front of cv, impact

Additional Investigation Questions

When did you first see the other vehicle?
What action did you take when you saw the other vehicle before
What were you doing immediately prior to the impact?
What direction were you looking before the impact?
Where in the intersection/lane did the impact take place?

- "Additional Questions" generated based on "Accident Description" = FTYROW; Lane Change; Backing; Rear-End
- "Additional Questions" display for:
  - "Loss Details" tab in FNOL flow for claimant driver
  - "Add Statement" fly out for claimant driver Statement:

◁ ▷

(not necessarily recorded statement)

Mark 'Take Statement' ○ Yes ● No
task complete?

⇩Next | 📄Go To Summary | ✖Cancel | ⊙Exit

FIG. 8

METHODS AND SYSTEMS FOR ASSESSING COMPARATIVE NEGLIGENCE

TECHNICAL FIELD

Various embodiments of the present disclosure generally relate to insurance claims. More specifically, various embodiments of the present disclosure relate to methods and systems for assessing comparative negligence and training adjustors in allocating comparative negligence.

BACKGROUND

Insurance companies pay out millions of dollars in insurance claims to claimants each year from claims against their insured customers. Some states have adopted a rule of comparative negligence, which is a tort rule for allocating damages when both parties are at least somewhat at fault. Under a comparative negligence regime, a plaintiff's damages are reduced by the amount of negligence allocated to the plaintiff. Indeed, even a 1% change in negligence assessments can reduce an insurance company's liability by a significant amount. The insurance companies rely on claims adjustors to collect information relating to the claim and to make negligence assessments (and ultimately liability assessments) for claims. Thus, the claims adjustors must take particular care in allocating negligence.

SUMMARY

In some embodiments, a computer-implemented method includes receiving information relating to a collision involving two or more vehicles where the information includes a type of accident. An initial negligence allocation between an insured vehicle and a claimant vehicle may be received from a claims adjustor into the comparative negligence assessment system, and questions may be dynamically generated based on the information relating to the collision and the initial negligence allocation. The questions may be used by the claims adjustor to reevaluate the initial negligence allocation. A finalized negligence allocation between the insured vehicle and the claimant vehicle may be received from the claims adjustor.

In some embodiments, a first question of the dynamically generated questions includes requesting the claims adjustor to indicate a point of impact of at least one of the two or more vehicles. An indication of the point of impact of at least one of the two or more vehicles may be received.

The additional questions of the dynamically generated questions may be based on the type of accident and the point of impact. The request to indicate the point of impact may be a request to indicate the point of impact of the insured vehicle.

In some embodiments, dynamically generating questions includes presenting questions only when the initial negligence allocation allocates all negligence to the insured vehicle. In some embodiments, dynamically generating questions includes presenting questions only when the type of accident is one of: a failure to yield right of way, backing, lane change, or rear end.

The dynamically generated questions may be generated based on a skill level of the claims adjustor. In some embodiments, the finalized negligence allocation may be compared with the initial negligence allocation. The comparison may be used to assess a skill level of the claims adjustor.

In some embodiments, the method further includes collecting comparisons of finalized negligence allocations with initial negligence allocations, analyzing information relating to the comparisons, and generating a report of the claims adjustor. The report may include the comparisons and an assessment of skill level or progress of the claims adjustor.

In some embodiments, the method further includes presenting initial investigation questions to ask the insured vehicle and the claimant vehicle. The initial investigation questions may be based on the type of accident. The received answers to the dynamically generated questions may be recorded.

In some embodiments, the disclosure describes a non-transitory, computer-readable medium having computer-readable instructions stored thereon, which, when executed by one or more processors, configure the one or more processors for: receiving information relating to a collision involving two or more vehicles, wherein the information includes a type of accident; receiving, from a claims adjustor, one or more inputs indicative of an initial negligence allocation between an insured vehicle and a claimant vehicle; dynamically generating questions based on the information relating to the collision and the initial negligence allocation; and receiving, from the claims adjustor, a finalized negligence allocation between the insured vehicle and the claimant vehicle. The questions may be used by the claims adjustor to reevaluate the initial negligence allocation.

In some embodiments, the information relating to the collision includes a point of impact of at least one of the two or more vehicles. The dynamically generated questions may be based on the type of accident and the point of impact.

The non-transitory, computer-readable medium may further include instructions, which, when executed by one or more processors, configure the one or more processors for generating a report assessing the claims adjustor. The report may include a statistical assessment identifying a number of times the initial negligence allocation differs from the final negligence allocation and an average degree of difference between the initial negligence allocation and the final negligence allocation.

In some embodiments, a system comprises an investigation module operable to receive information relating to a collision involving two or more vehicles. The information may include a point of impact of at least one of the vehicles. The system may further include an initial negligence allocation module operable to receive an initial negligence allocation between an insured vehicle and a claimant vehicle, and a determination engine operable to determine whether to generate additional questions for a claims adjustor to reevaluate the initial negligence allocation. The determination may be based on the point of impact and the initial negligence allocation.

In some embodiments, the system further comprises a generation engine operable to generate the additional questions when the initial negligence allocation allocates all negligence to the insured vehicle.

In some embodiments, the system further comprises a generation engine operable to generate the additional questions when the initial negligence allocation allocates all negligence to the insured vehicle and the type of accident is one of: a failure to yield right of way, backing, lane change, or rear end.

The statements from a driver of the insured vehicle and a driver of the claimant vehicle may be required before presenting the claims adjustor with the additional questions.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which:

FIG. 6 illustrates an example of a user interface that may be used in a comparative negligence assessment system in accordance with various embodiments of the disclosure;

FIG. 7 illustrates an example of a user interface that may be used in a comparative negligence assessment system;

FIG. 8 illustrates an example of a user interface that may be used in a comparative negligence assessment system in accordance with various embodiments of the disclosure;

Figure 1:
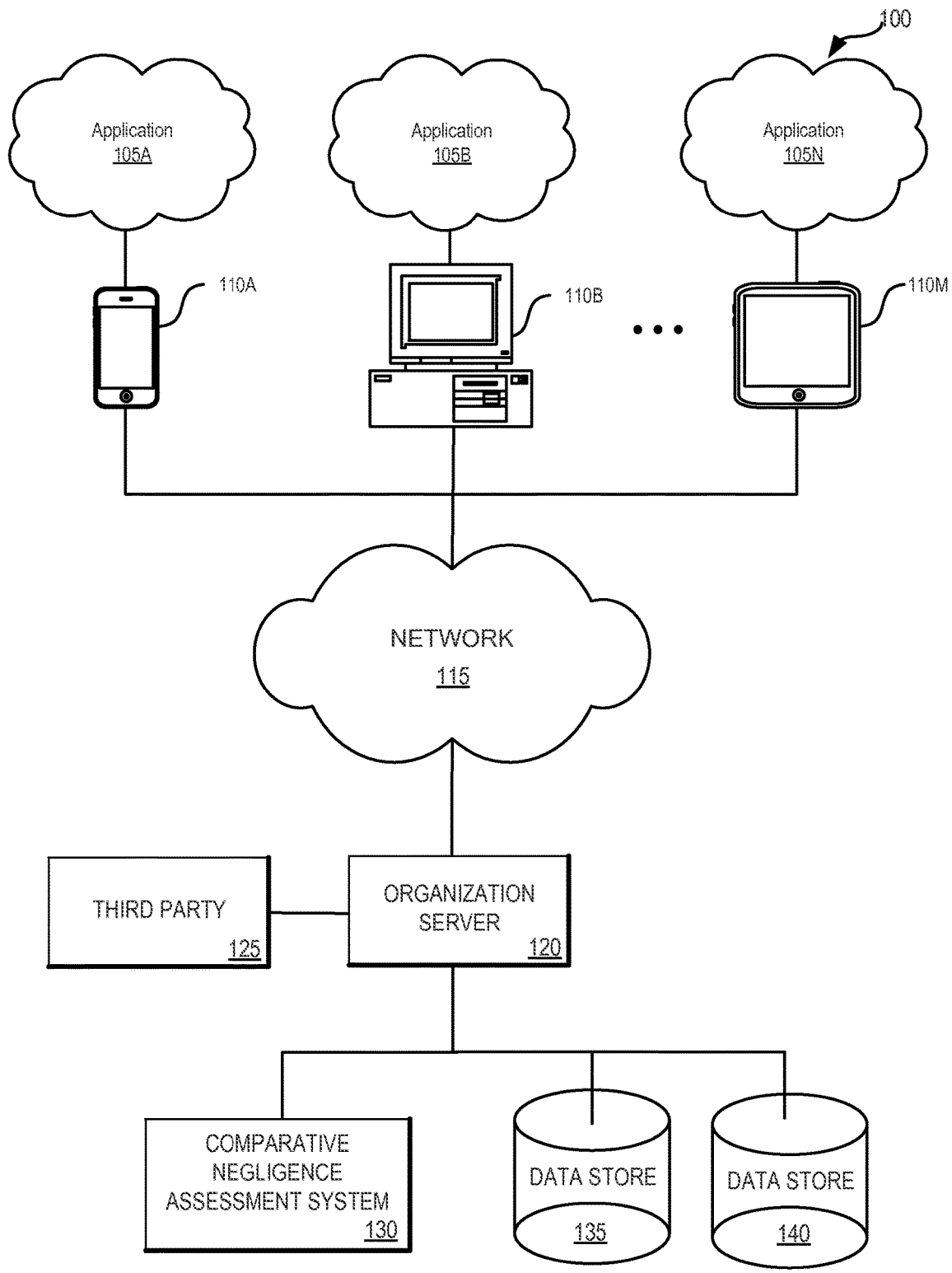
FIG. 1 illustrates an example of an operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to insurance claims. More specifically, various embodiments of the present disclosure relate to methods and systems for assessing comparative negligence and training adjustors in allocating comparative negligence.

After a claim is reported and assigned to a claims adjustor, the claims adjustor is expected to collect information relating to the claim, analyze the information, and provide a negligence assessment. Indeed, claims adjustors need to understand how to arrive at supportable negligence assessments and the resulting liability determinations.

Some states have adopted a system of comparative negligence in assessing responsibility and damages in tort claims. Comparative negligence can be defined as the amount of negligence allocated between the plaintiff and the defendant with a corresponding reduction in damages paid to the plaintiff. When assessing claims involving comparative negligence, existing tools collect information and produce a range of comparative negligence values at the end of the process. But, adjustors are still required to determine a comparative negligence value. This disclosure describes a comparative negligence tool that assists with training and developing claims adjustors in applying comparative negligence to various situations. The tool provides consistent feedback and reporting, enabling management to monitor the development and skill level of the claims adjustors.

In various embodiments, a claims adjustor may collect information about a claim, such as a car accident involving an insured driver and a claimant driver. Depending on the type of claim, the adjustor may be presented with particular types of questions to ask and may be required to allocate negligence between the insured and the claimant. Under certain circumstances (e.g., if the adjustor assigns 100% negligence to the insured), the adjustor may be asked a series of questions. The questions may be dynamic in that the questions change depending on the answer from a previous question, the collected informations, local rules, various standards or best practices, company preferences, and/or other factors. After the questions have been answered, the adjustor may be asked to reevaluate the negligence allocation. The difference between the initial negligence assessment and the finalized negligence assessment may be recorded and used to analyze the progress and skill level of the adjustor. Reports showing statistics may be generated and used in training and rating the adjustor.

Overall benefits gained by employing the comparative negligence assessment system include managerial time savings by identifying the adjustors who need training, development of highly skilled adjustors that create defendable liability assessments in comparative negligence situations, and savings from organization liability due to thoroughly assessed negligence allocations. Additionally, the comparative negligence assessment system can be implemented in existing claims systems and only adds a few mouse clicks for the adjustor.

In the following description, for the purposes of explanation, numerous specific details are set forth in order to provide a thorough understanding of embodiments of the present disclosure. It will be apparent on reading the disclosure, however, to one skilled in the art that embodiments may be practiced without some of these specific details. Additionally, although examples including vehicles are discussed, systems and methods described may apply to any claim involving comparative negligence. For example, embodiments of this disclosure could be used in theoretical systems such as an Electronic Settlement Software which may incorporated into arbitration and/or mediation procedures or for attorney represented or non-represented parties.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of an operating environment 100 in which some embodiments of the present disclosure may be used. As illustrated in FIG. 1, operating environment 100 may include applications 105A-105N running on one or more user devices 110A-110M (such as a mobile device, a mobile phone, a tablet computer, a mobile media device, a mobile gaming device, a vehicle-based computer, a dedicated terminal, a public terminal, a kiosk, etc.). In some embodiments, applications 105A-105N may be stored on the user device or may be stored remotely. These user devices can include mechanisms for receiving and sending traffic by connecting through network 115 to organization server 120, third party 125, comparative negligence assessment system 130, and data stores 135 and 140. For example, user devices 110A-110M may run one or more applications or clients 105A-105N that allow a user to interact with organization server 120. Such applications may provide access to information such as information stored in data stores 135 and 140.

In addition, user devices 110A-110M can include network communication components that enable the user devices 110A-110M to communicate with network 115 or other electronic devices by transmitting and receiving wireless signals using a licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks, such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications networks.

Organization server 120 may be a web server (e.g., HTTP server) that is used to serve static or dynamic content such as websites and may be communicably connected to one or more application servers for dynamic content processing. Organization server 120 may be communicable coupled with third party 125, and may access or receive data (e.g., public driving records, vehicle or home ownership records, claimant insurance information, etc.) from third party 125 (e.g., public records, other insurance companies, etc.). Data stores 135 and 140 can be used to manage storage and access to member data such as insurance policies and property, prior claims made against the insured, etc. Organization server 120 may be associated with a membership organization, and the users may be members or potential members of the membership organization. The organization may be a financial institution and/or an insurance company.

Third party 125 may be an insurance company, an entity with public information, or other entity that may provide information relating to a claim. Third party 125 may provide, to organization server 120 information relating to a claim such as a witness statement; road conditions; police reports; a claimant's insurance policy, driving record, property ownership, health records, and previous claims. Third party 125 may aggregate such information and send or provide access to this data to organization server 120. In some embodiments third party 125 may provide access or send the data directly to comparative negligence assessment system 130.

Comparative negligence assessment system 130 may assist with assessing comparative negligence by receiving information and an initial negligence allocation for the parties, generating a set of questions based on the information and the initial negligence allocation, receiving a finalized negligence allocation, and developing a report. In some embodiments comparative negligence assessment system 130 is a system operating independently of other claims assessments systems and in some embodiments comparative negligence assessment system 130 is integrated into an existing claims system.

Comparative negligence assessment system 130 may have access to a computer system associated with the organization or authorized third parties and may access the data stores 135 and 140 for insurance information, insured property information, driving records, criminal history, account information, security information, initial and final negligence allocations, and other stored information. In addition, third parties may provide information relating to claimants or the insured such as addresses, previous insurance claims, or any other information.

Data stores 135 and 140 may be a data repository of a set of integrated objects that are modeled using classes defined in database schemas. Data stores 135 and 140 may further include flat files that can store data. Data stores 135 and 140 may store information about members and/or insured customers, including insurance policies, insured property, historic and current claims information, billing statements, employment information, account balances, credit ratings, length of time the user has possessed a payment instrument, home ownership information, annual salary, length of membership, and/or other information. Organization server 120 and/or other servers may collect and/or access data from the data stores 135 and 140.

Figure 2:
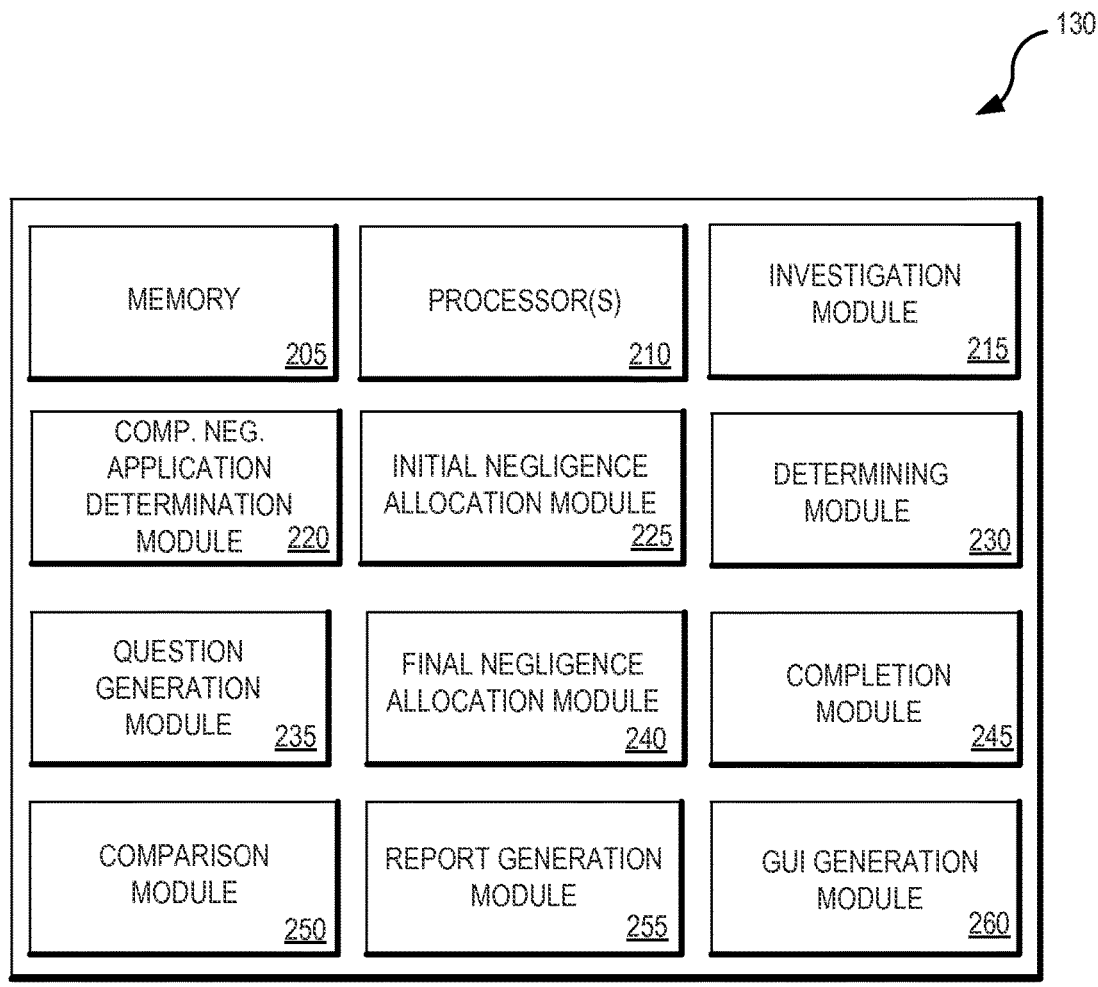
FIG. 2 is a block diagram illustrating components that can be included in a comparative negligence assessment system in accordance with various embodiments of the disclosure.

FIG. 2 is a block diagram illustrating components that can be included in a comparative negligence assessment system such as comparative negligence assessment system 130.

According to the embodiments shown in FIG. 2, comparative negligence assessment system 130 may include memory 205, processor(s) 210, investigation module 215, comparative negligence application determination module 220, initial negligence allocation module 225, determining module 230, question generation module 235, final negligence allocation module 240, completion module 245, comparison module 250, report generation module 255, and Graphic User Interface (GUI) generation module 260. Other embodiments of the present disclosure may include some, all, or none of these modules and components along with other modules, applications, and/or components. The modules and components illustrated in FIG. 2 may be hardware, firmware, software, or a combination. Some embodiments may incorporate two or more of these modules into a single module and/or associate a portion of the functionality of one or more of these modules with a different module.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of investigation module 215, comparative negligence application determination module 220, initial negligence allocation module 225, determining module 230, question generation module 235, final negligence allocation module 240, completion module 245, comparison module 250, report generation module 255, and GUI generation module 260.

Investigation module 215 may be configured to receive information relating to a claim. The information may be received or accessed from people involved or witnessing an accident, police officers, public databases, databases internal and external to the organization, recorded statements, police reports, etc. Information may include a type of accident, type of property, persons involved, date of the accident, historical and current claims information, points of impact, video recordings, etc. The information may be used by comparative negligence application determination module 220 or determining module 220 in determining questions to be answered.

Investigation module 215 may be further configured to present questions based on information received to ensure specific information is collected. For example, adjustors often interview drivers involved in vehicle collisions. Depending on the type of accident or the circumstances, questions may appear on the adjustor's screen to ensure that the adjustor asks these questions. For example, in FIG. 8, additional investigation questions based on the accident description may be dynamically generated and presented for the adjustor to be ask. The information collected from asking these questions may be used later to determine and provide support for the negligence allocations. In some embodiments, written answers to the questions are captured in an overall summary.

In collecting the information relating to the claim, the adjustor may be required to login to an organization system. A database in connection with the organization system may include information relating to the adjustor's experience level and past performance. Information relating to the adjustor may be used by report generation module 255 to generate reports. For example, different reports may be generated based on the adjustor's experience level or time of employment with the organization. In some cases, the adjustor may have performed poorly in the past such that special reports are generated for the adjustor.

In some embodiments, determining module 230 may use information relating to the adjustor in determining which questions should be asked. In accordance with various embodiments, each adjustor may be assigned a skill level, trust score, or customized assessment profile. The skill level, trust score, or customized assessment profile allows the system to know where the adjustor will likely struggle to properly evaluate the claim. As such, determining module 230 can use this information relating to the adjustor to determine which questions should or should not be presented.

In some embodiments, the system may monitor the information being input by the adjustor. As various inputs are received, the system can evaluate the available information and determine (e.g., in real-time, near real-time, upon an indication of completion of various sections) if it is possible the adjustor is missing a line of questioning or other possible information that may be useful in assigning fault.

Comparative negligence application determination module 220 may be configured to determine whether comparative negligence applies to the claim. This may be based on the type of accident, location of the accident, type of property involved, dollar amount of the claim, or other factors. For example, some states do not operate under a comparative negligence regime. In some embodiments, comparative negligence will not be considered if both the claimant and the insured have not provided statements.

In some embodiments, if the claim is a car accident involving two or more vehicles, comparative negligence application determination module 220 may determine whether the accident type is a failure to yield right of way, backing, lane change, or rear end. When the type of accident is one of these types of accidents, then comparative negligence applies and initial negligence allocation module 225 is configured to request and receive an initial negligence allocation. If the accident is not classified as one of the particular types mentioned, then the comparative negligence is skipped and the claim is completed and submitted in completion module 245 after all relevant information is gathered, assessed, and finalized.

Figure 9:
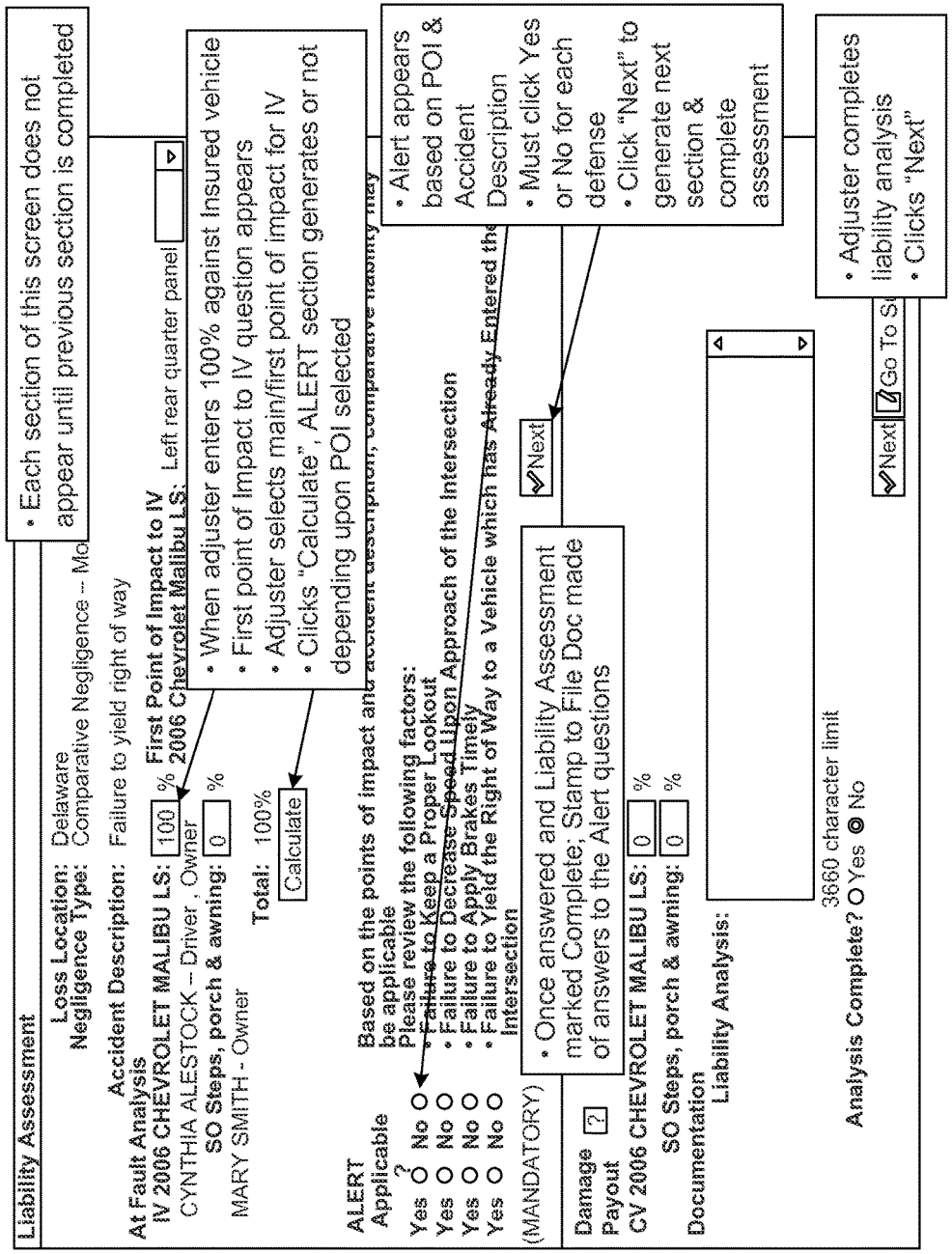
FIG. 9 illustrates an example of a user interface that may be used in a comparative negligence assessment system in accordance with various embodiments of the disclosure.

Initial negligence allocation module 225 may be configured to receive an initial negligence allocation when comparative negligence application determination module 220 determines that comparative negligence applies. The adjustor may be asked to input a percentage of negligence that can be attributed to the parties (claimant, insured, or others) based on the information collected from investigation module 215. If only two parties are involved (claimant and insured), the claims adjustor may only be required to input one allocation and initial negligence allocation module 225 will calculate the negligence allocation for the other party. FIG. 9 depicts a screen in which the adjustor is asked to input a percentage of negligence under the "At Fault Analysis" portion of the screen. The initial negligence allocations may be stored for use by comparison module 250 and report generation module 255.

In some embodiments, initial negligence allocation module 225 may produce a recommended range based on the collected information. Initial negligence allocation module 225 may be configured to communicate the allocation to determining module 230. Determining module 230 may be configured to determine whether the adjustor is required to answer additional questions to reevaluate the initial negligence allocations or whether the claim can be completed by completion module 245. In some embodiments this is determined by the initial negligence allocations received in initial negligence allocation module 225. In some embodiments, determining module 230 determines that the adjustor must answer additional questions when the adjustor allocates 100% negligence to the insured vehicle.

In some embodiments, a negligence allocation threshold or range may be established depending on the collected information received from investigation module 215 and determining module 230 determines that the adjustor must answer additional questions when the initial negligence allocation allocates higher negligence than the threshold to the insured or when the negligence allocation to the insured is outside of the range. In other embodiments, determining module 230 may use additional information in combination with the initial negligence allocation information in determine whether to ask additional questions. In some embodiments, additional questions may be asked only when the claims adjustor is in training or has not reached a certain skill level.

Question generation module 235 generates and presents questions for the claims adjustor to answer when determining module 230 determines that the initial negligence allocations need to be reevaluated. The questions may be dynamically generated depending on the answers to the previous questions or information. In some embodiments, the questions are specific negligence act questions rather than vehicle maneuver questions. The questions may only be addressing the specific negligence acts of the claimant driver. By identifying specific negligence acts, the adjustor's comparative negligence case against the claimant is established.

An example of the dynamic nature of the questions is illustrated in the example user interface in FIG. 9. In FIG. 9, the claims adjustor may input a point of impact for one or all of the vehicles involved in an automobile accident. Depending on the point of impact and the accident description, certain questions are asked, such as, "Was there a failure to keep a proper lookout," and "Was there a failure to apply brakes timely?" In some embodiments, different questions are generated based on the characteristics of the particular adjustor. For example, the questions may vary based on the skill level of the adjustor, the adjustor's tendencies in allocating negligence, or the information collected from investigation module 215.

Question generation module 235 may be configured to record or store the answers to the questions in a database or data store such as data store 135 or 140. Answers to the questions may be part of a completed claims report. The answers may also be used in report generation module 255.

Final negligence allocation module 240 may be configured to receive a final negligence allocation from the adjustor after receiving answers to the questions generated by question generation module 235. The final negligence allocation is an opportunity for the claims adjustor to reevaluate the initial negligence allocation after considering the questions generated by question generation module 235. The answers to the questions generated should be supported by the information collected by investigation module 215. The example interface in FIG. 9 depicts a portion on the screen where the claims adjustor can provide a final negligence allocation.

The final negligence allocation may be used in the adjustor's liability analysis, and ultimately the amount of money each party is responsible for paying (if anything). The final negligence allocation may be recorded or stored and used by comparison module 250 and report generation module 255.

After the final negligence allocation is received, the adjustor can finalize the claim for completion in completion module 245. In some embodiments, if the variation is too large, additional questions may be asked.

Completion module 245 may be configured to receive a final claim submission, including a completed liability assessment, and submit the claims for final review by a supervisor or for payout. Completion module 245 may include a record of all information collected and considered in the assessment, including the initial and final negligence allocations and the answers to any questions presented.

Comparison module 250 may be configured to receive initial negligence allocations from initial negligence allocation module 225 and final negligence allocations from final allocation module 240 (or from completion module 245) and compare the differences in the values. For example, prior to answering the questions from question generation module 235, the adjustor may have allocated 100% negligence to the insured. After answering the questions, the adjustor may have input a final negligence allocation of 96%, resulting in a 4% difference. Comparison module 250 may communicate the results of the comparison to report generation module 255 to generate a report on the progress or skill level of the adjustor.

Report generation module 255 may be configured to receive information from comparison module 250, question generation module 235, investigation module 215, and other modules to prepare a report of the skill level and progress of the adjustor. The report can be for a single claim or for a number of claims. In some embodiments, the report includes statistics and metrics such as a number of times the initial negligence allocation differs from the final negligence allocation and an average amount of difference between the initial negligence allocation and the final negligence allocation. These statistics may be compared with statistics of similarly experienced adjustors to determine whether the adjustor needs additional training.

GUI generation module 260 can generate one or more GUI screens that allow for interaction with a user. In at least one embodiment, GUI generation module 260 generates a graphical user interface receiving and/or conveying information to the adjustor and allows the adjustor to view reports identifying the claimant and the insured, claim status, or other information.

Figure 3:
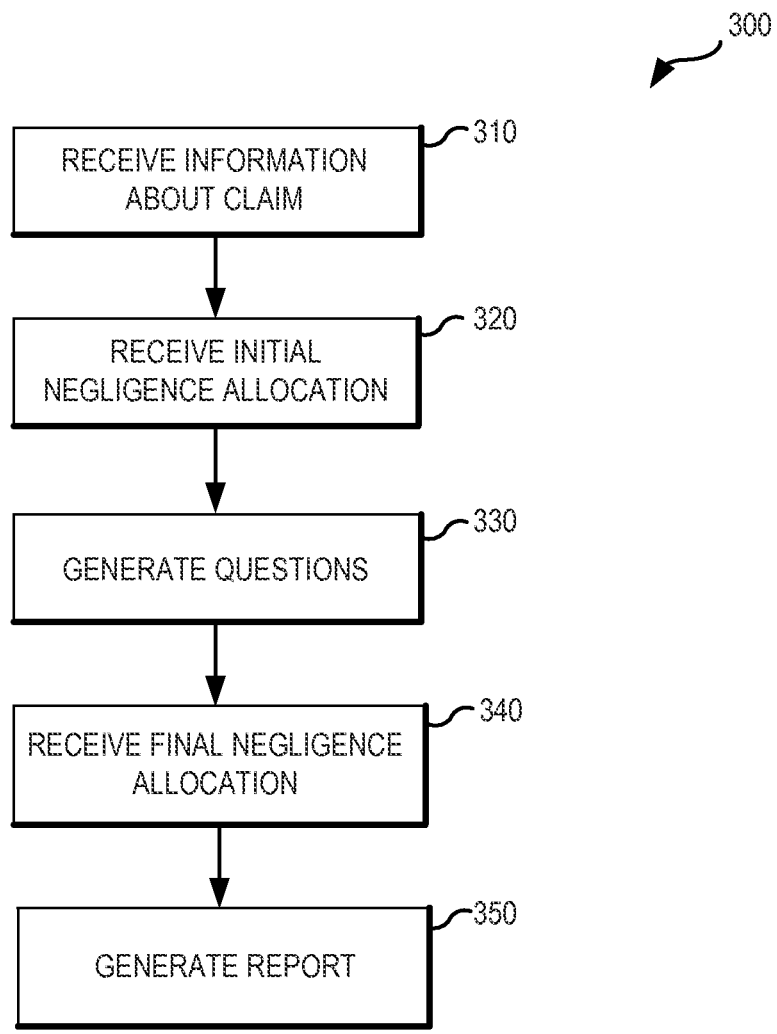
FIG. 3 is a flowchart illustrating a set of operations for assessing comparative negligence in accordance with various embodiments of the disclosure.

FIG. 3 is a flowchart illustrating a set of operations 300 for assessing comparative negligence in accordance with various embodiments of the present disclosure. In some embodiments, fewer than all of the operations are performed, whereas in other embodiments additional operations are performed, such as operations performed in the sets of operations described in FIGS. 4-5. Moreover, in some embodiments, the operations may be performed in different orders or in parallel. The operations can be performed by various components in FIG. 2 such as memory 205, processor(s) 210, investigation module 215, comparative negligence application determination module 220, initial negligence allocation module 225, determining module 230, question generation module 235, final negligence allocation module 240, completion module 245, comparison module 250, and report generation module 255.

Receiving operation 310 receives information about a claim. The information may be received from various sources such as the claimant, the insured person, public records, an adjustor, etc. The information may include a location where the claim arose, the parties involved, a type of claim or accident, points of impact, damage caused, and other information.

Based on the information received in receiving operation 310, the adjustor may assign an initial negligence allocation which is received by the system during receiving operation 320. For example, the adjustor may allocate 70% negligence to the insured vehicle and 30% negligence to the claimant vehicle (or driver). Based on various collected information (e.g., type of accident, points of impact) and possibly the negligence allocation, questions are generated in generating operation 330. These questions may assist the adjustor in reassessing and/or defending the allocations the adjustor assigned.

Finalizing operation 340 receives a finalized negligence allocation from the adjustor. The finalized negligence allocation may differ from the initial negligence allocation. Report generating operation 350 may generate a report including a comparison of the initial and finalized negligence allocations. The report may provide insight into the adjustor's progress and skill level. This report can be used by management in evaluating adjustors, assigning additional training, monitoring development, providing automated recommendations (e.g., promotion), and the like. In some embodiments, information regarding multiple adjustors may be aggregated.

Figure 4:
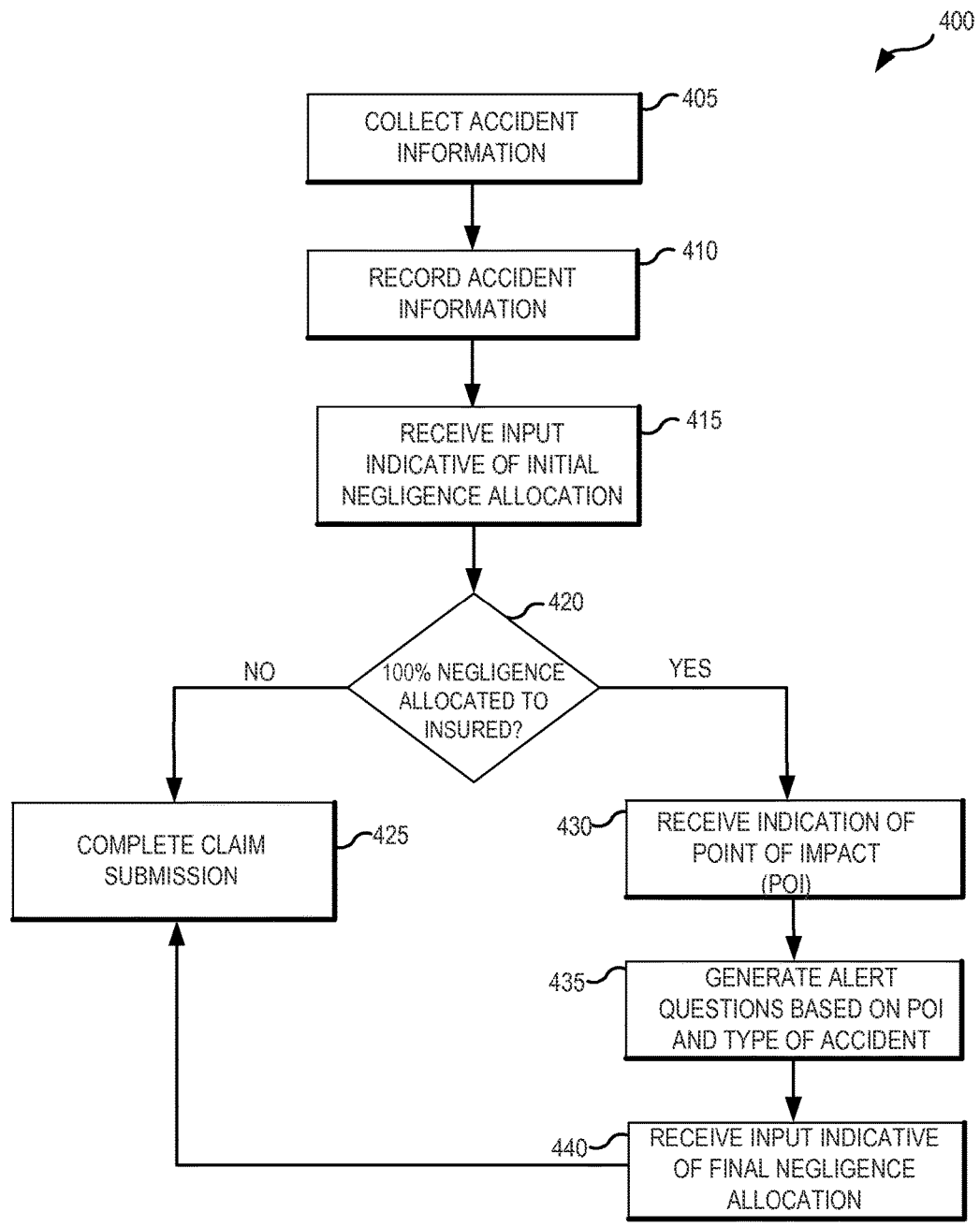
FIG. 4 is a flowchart illustrating a set of operations for assessing comparative negligence in accordance with various embodiments of the disclosure.

FIG. 4 is a flowchart illustrating a set of operations 400 for assessing comparative negligence in accordance with various embodiments of the disclosure. In some embodiments, fewer than all of the operations are performed, whereas in other embodiments additional operations are performed, such as operations performed in the sets of operations described in FIGS. 3 and 5. Moreover, in some embodiments, the operations may be performed in different orders or in parallel. The operations can be performed by various components in FIG. 2 such as memory 205, processor(s) 210, investigation module 215, comparative negligence application determination module 220, initial negligence allocation module 225, determining module 230, question generation module 235, final negligence allocation module 240, completion module 245, comparison module 250, and report generation module 255.

Collecting operation 405 collects accident information such as parties involved, location of the accident, type of property involved, type of accident, statements from witnesses and parties involved, police reports and other information. The information may be received from various entities (e.g., insurance companies, the involved parties, public databases, and internal databases) and may be input into the system by an adjustor. Recording operation 410 records the accident information in an organization database.

Receiving operation 415 receives an initial negligence allocation. The initial negligence allocation may be input into the comparative negligence assessment system by the claims adjustor.

Decision operation 420 determines whether 100% of the negligence was allocated to the insured. When 100% (or other amount determined by the comparative negligence assessment system) is not allocated to the insured, decision operation 420 branches to completing operation 425 where the claim submission is completed. When decision operation 420 determines 100% is allocated to the insured, the adjustor is asked to identify a point of impact, which is received into the comparative negligence assessment system in receiving operation 430. The adjustor may identify the point of impact by typing in a point of impact, selecting a point of impact from a drop down, indicating a point of impact on a diagram, etc. The point of impact may be identified for all involved vehicles or only for one of the vehicles.

Based on the received point of impact and the type of accident, a series of questions may be generated and presented to the adjustor for consideration in generating operation 435. The adjustor may be required to select or input answers to these questions. The questions may be specific negligence questions and the questions may be generated based on answers received previously. After answering the questions, the adjustor may input or select a final negligence allocation that is received into the comparative negligence assessment system in receiving operation 440. The final negligence allocation may differ from the initial negligence allocation. After the adjustor provides the final negligence allocation and completes the liability assessment, the claim may be submitted in completing operation 425.

Figure 5:
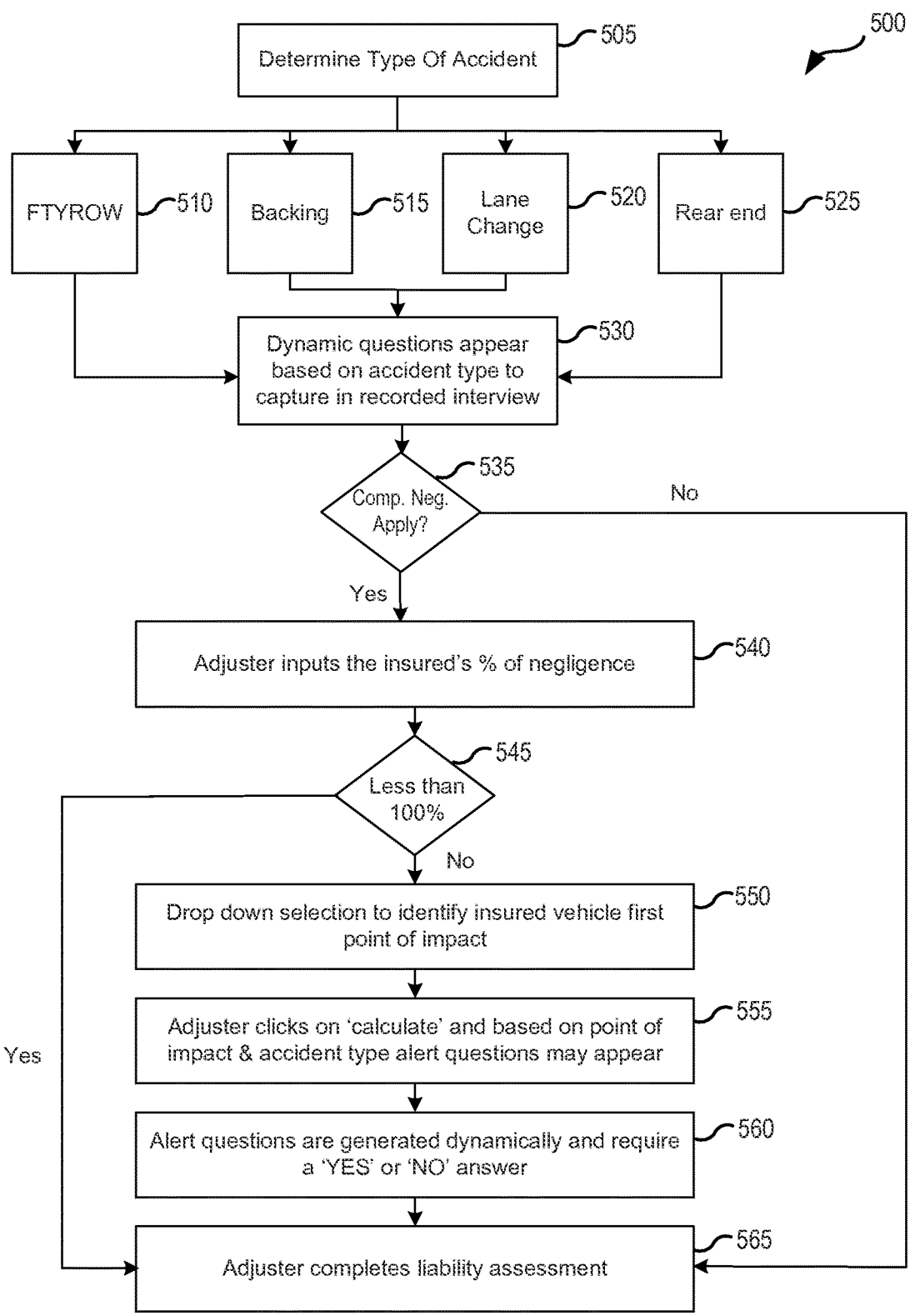
FIG. 5 is a flowchart illustrating a set of operations for assessing comparative negligence in accordance with various embodiments of the disclosure.

FIG. 5 is a flowchart illustrating a set of operations 500 for assessing comparative negligence in accordance with various embodiments of the disclosure. In some embodiments, fewer than all of the operations are performed, whereas in other embodiments additional operations are performed, such as operations performed in the sets of operations described in FIGS. 3-4. Moreover, in some embodiments, the operations may be performed in different orders or in parallel. The operations can be performed by various components in FIG. 2 such as memory 205, processor(s) 210, investigation module 215, comparative negligence application determination module 220, initial negligence allocation module 225, determining module 230, question generation module 235, final negligence allocation module 240, comparison module 250, and report generation module 255.

As illustrated in FIG. 5, a claims adjustor may determine a type of accident during determination operation 505. The type of accident may be a failure to yield right of way (FTYROW) 510, backing 515, lane change 520, or rear end 525. Generation operation 530 can use this information regarding the type of accident to dynamically generate questions the adjustor should consider. These questions vary with the type of accident and may be presented to the adjustor to ask when taking a recorded interview. Next, determination operation 535 determines (e.g., by evaluating the answers to the dynamically generated questions and the information regarding the type of accident) whether comparative negligence applies. In some embodiments, comparative negligence applies only to certain accident types such as the ones listed in the figure or to accidents in certain states. When determination operation 535 determines that comparative negligence does not apply, the adjustor is prompted to finish collecting information and provides a liability assessment to complete the claim.

When determination operation 535 determines that comparative negligence does apply, determination operation 535 branches to prompting operation 540 where the adjustor inputs an insured's percent of negligence. Allocation decision operation 545 determines if the percent of negligence assigned to the insured is less than 100% (or other set percentage or amount). Upon determining that the criteria is met, then the adjustor is allowed to finish collecting information and provide a liability assessment to complete the claim in completion operation 565. Alternatively, if allocation decision operation 545 determines the percent of negligence assigned to the insured is 100% (or other criteria has been met), then the adjustor is prompted to identify the insured vehicle's first point of impact during identification operation 550. Depending on the point of impact and the type of accident, questions may be generated and appear on the adjustor's screen during question operation 555. These questions may require a yes or no answer or allow for a free text response. Responses to these questions are gathered during receiving operation 560. After considering the questions, the adjustor may then finalize the negligence allocation and complete the liability assessment during completion operation 565.

FIG. 6 illustrates an example of a user interface that may be used in connection with a comparative negligence assessment system. FIG. 6 illustrates a user interface the adjustor may use when documenting claim information. The information may include who reported the claim, the type of loss, the initial loss description, a status of injuries, a date of the loss, and the vehicles involved.

FIG. 7 illustrates an example of a user interface that may be used in connection with a comparative negligence assessment system. FIG. 7 illustrates an example of a user interface that the adjustor may use when documenting claim information. The "Take Recording" button may be disabled until the adjustor selects collision as the type of loss.

FIG. 8 illustrates an example of a user interface that may be used in connection with a comparative negligence assessment system. FIG. 8 illustrates a user interface the adjustor may use when documenting claim information. The user interface includes an additional questions portion. The additional questions may be generated during the initial investigation of the claim. The questions may be generated based on the accident description or type (e.g., failure to yield right of way, lane change, backing, rear end). Additional questions may be displayed in a loss details tab in a first notice of loss flow for the claimant driver. The adjustor may be notified to add a statement for the claimant driver. In some embodiments, comparative negligence is not assessed unless a statement is taken from the claimant driver.

FIG. 9 illustrates an example of a user interface that may be used in connection with a comparative negligence assessment system. FIG. 9 illustrates a user interface that the adjustor may use when documenting claim information and making a negligence and liability assessment. In some embodiments, the sections of the screen appear after the previous section is completed. As shown in FIG. 9, when the adjustor enters a negligence value of 100% against the insured vehicle, the adjustor is asked to identify a point of impact to the insured vehicle. After the adjustor click on the "calculate" button, an alert section may be generated depending on the point of impact selected. The initial negligence allocation may be recorded at this point (or at other points).

If the alert section appears, it may include a series of questions for the particular claim, type of accident, point of impact, etc. The questions may be designed to assist the adjustor with creating a defendable negligence allocation and may be particularly directed at specific negligence acts on the part of the claimant. When the questions are answered, the adjustor has the opportunity to input a final negligence allocation. The final negligence allocation may be input into the same area as the initial negligence allocation area or it may be input into a different area. The adjustor then provides a liability determination and analysis based on the information. When the adjustor has completed the analysis, the adjustor may click next to leave the page and finalize for claim submission.

Computer System Overview

Figure 10:
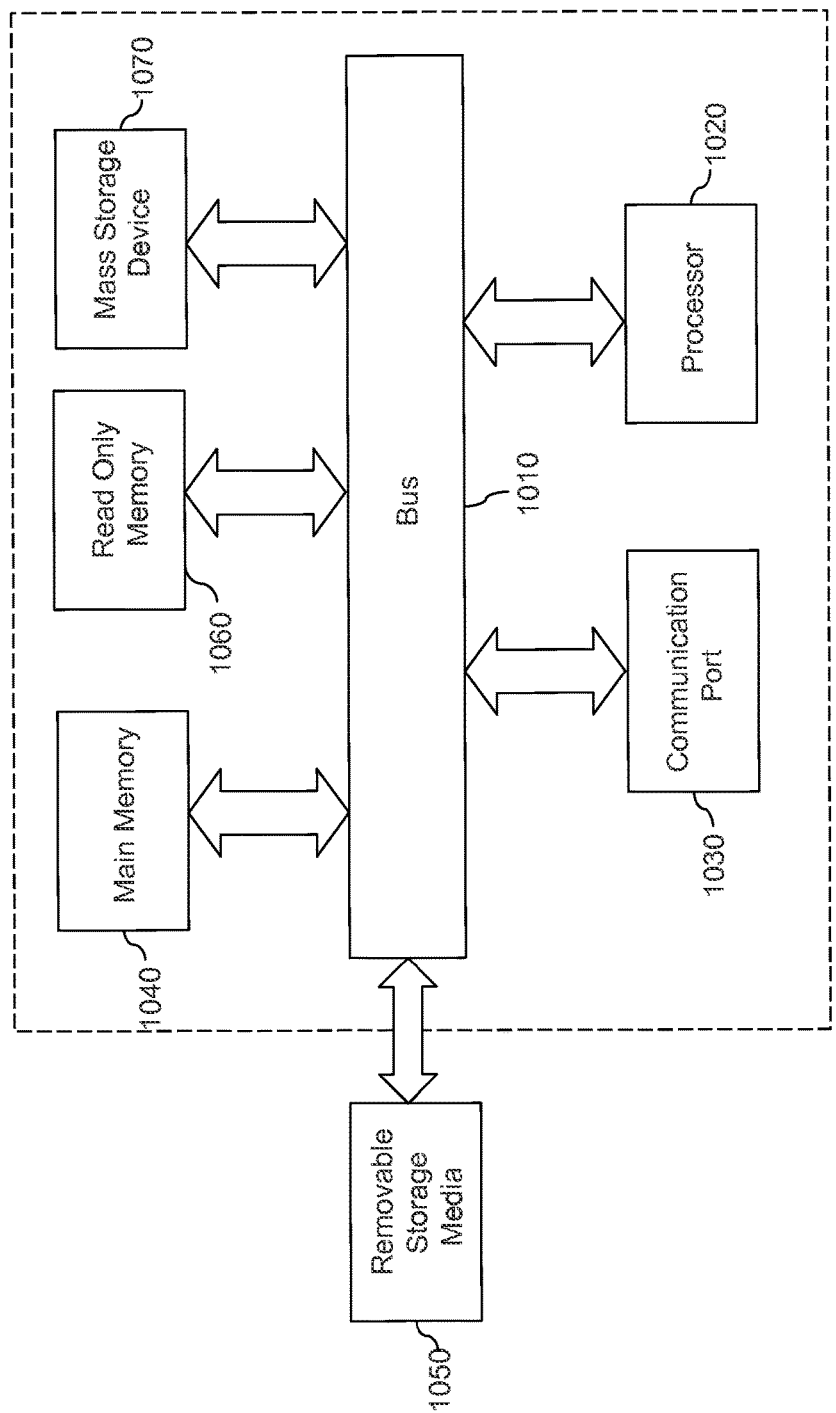
FIG. 10 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 10 is an example of a computer system 1000 with which embodiments of the present disclosure may be utilized. According to the present example, the computer system includes a bus 1010, at least one processor 1020, at least one communication port 1030, a main memory 1040, a removable storage media 1050, a read only memory 1060, and a mass storage 1070.

Processor(s) 1020 can be any known processor, such as, but not limited to, an Intel® Itanium® or Itanium 2® processor(s), or AMD® Opteron® or Athlon MP® processor(s), or Motorola® lines of processors. Communication port(s) 1030 can be any of an RS-232 port for use with a modem-based dialup connection, a 10/100 Ethernet port, or a Gigabit port using copper or fiber. Communication port(s) 1030 may be chosen depending on a network such a Local Area Network (LAN), Wide Area Network (WAN), or any network to which the computer system 700 connects.

Main memory 1040 can be Random Access Memory (RAM), or any other dynamic storage device(s) commonly known in the art. Read only memory 1060 can be any static storage device(s) such as Programmable Read Only Memory (PROM) chips for storing static information such as instructions for processor 1020.

Mass storage 1070 can be used to store information and instructions. For example, hard disks such as the Adaptec® family of SCSI drives, an optical disc, an array of disks such as RAID, such as the Adaptec family of RAID drives, or any other mass storage devices may be used.

Bus 1010 communicatively couples processor(s) 1020 with the other memory, storage, and communication blocks. Bus 1010 can be a PCI/PCI-X or SCSI based system bus depending on the storage devices used.

Removable storage media 1050 can be any kind of external hard-drives, floppy drives, (OMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for assessing comparative negligence and training adjustors to correctly allocate comparative negligence. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
   receiving, by a processor of a comparative negligence assessment system, information relating to a collision involving two or more vehicles, wherein the information includes a type of accident;
   receiving, from a claims adjustor into the comparative negligence assessment system, an initial negligence allocation between an insured vehicle and a claimant vehicle;
   dynamically generating, by the processor of the comparative negligence assessment system, questions based on the information relating to the collision, the initial negligence allocation and a skill level of the claims adjustor, the dynamically generated questions being displayed on a computing device associated with the claims adjustor in response to receiving the information relating to the collision and the initial negligence allocation,
      wherein the questions are used by the claims adjustor to reevaluate the initial negligence allocation; and
   receiving, from the claims adjustor through the comparative negligence assessment system, a finalized negligence allocation between the insured vehicle and the claimant vehicle.

2. The computer-implemented method of claim 1, wherein a first question of the dynamically generated questions includes requesting the claims adjustor to indicate a point of impact of at least one of the two or more vehicles, and the computer-implemented method further includes receiving the indication of the point of impact of at least one of the two or more vehicles.

3. The computer-implemented method of claim 2, wherein additional questions of the dynamically generated questions are based on the type of accident and the point of impact.

4. The computer-implemented method of claim 2, wherein the request to indicate the point of impact is a request to indicate the point of impact of the insured vehicle.

5. The computer-implemented method of claim 1, wherein dynamically generating questions includes presenting questions only when the initial negligence allocation allocates all negligence to the insured vehicle.

6. The computer-implemented method of claim 1, wherein dynamically generating questions includes presenting questions only when the type of accident is one of: a failure to yield right of way, backing, lane change, or rear end.

7. The computer-implemented method of claim 1, further comprising generating, by the processor, a comparison of the finalized negligence allocation with the initial negligence allocation.

8. The computer-implemented method of claim 7, further comprising using the comparison to assess a skill level of the claims adjustor.

9. The computer-implemented method of claim 1, further comprising:
   collecting comparisons of finalized negligence allocations with initial negligence allocations;
   analyzing information relating to the comparisons; and
   generating a report of the claims adjustor,
      wherein the report includes the comparisons and an assessment of skill level or progress of the claims adjustor.

10. The computer-implemented method of claim 1, further comprising presenting initial investigation questions to ask the insured vehicle and the claimant vehicle, the initial investigation questions based on the type of accident.

11. The computer-implemented method of claim 1, further comprising recording received answers to the dynamically generated questions.

12. A non-transitory, computer-readable medium, the computer-readable medium having computer-readable instructions stored thereon, which, when executed by one or more processors, configure the one or more processors for:
- receiving information relating to a collision involving two or more vehicles, wherein the information includes a type of accident;
- receiving, from a claims adjustor, one or more inputs indicative of an initial negligence allocation between an insured vehicle and a claimant vehicle;
- dynamically generating questions based on the information relating to the collision, the initial negligence allocation and a skill level of the claims adjustor, the dynamically generated questions being displayed on a computing device associated with the claims adjustor in response to receiving the information relating to the collision and the initial negligence allocation,
  - wherein the questions are used by the claims adjustor to reevaluate the initial negligence allocation; and
- receiving, from the claims adjustor, a finalized negligence allocation between the insured vehicle and the claimant vehicle.

13. The non-transitory, computer-readable medium of claim 12, wherein the information relating to the collision includes a point of impact of at least one of the two or more vehicles.

14. The non-transitory, computer-readable medium of claim 13, wherein the dynamically generated questions are further based on the type of accident and the point of impact.

15. The non-transitory, computer-readable medium of claim 13, further comprising instructions, which, when executed by one or more processors, configure the one or more processors for generating a report assessing the claims adjustor, wherein the report includes a statistical assessment identifying a number of times the initial negligence allocation differs from the final negligence allocation and an average degree of difference between the initial negligence allocation and the final negligence allocation.

16. A system comprising:
- a memory; and
- a processor in communication with the memory, the processor operable to execute software modules, the software modules comprising:
  - an investigation module operable to receive information relating to a collision involving two or more vehicles,
    - wherein the information includes a point of impact of at least one of the vehicles,
  - an initial negligence allocation module operable to receive an initial negligence allocation between an insured vehicle and a claimant vehicle, and
  - a determination engine operable to determine whether to generate additional questions for a claims adjustor to reevaluate the initial negligence allocation, wherein when the additional questions are generated, the additional questions are displayed on a computing device associated with the claims adjustor,
    - wherein the determination is based on the point of impact, a skill level of the claims adjustor, and the initial negligence allocation.

17. The system of claim 16, wherein the system further comprises a generation engine operable to generate the additional questions when the initial negligence allocation allocates all negligence to the insured vehicle.

18. The system of claim 17, wherein statements from a driver of the insured vehicle and a driver of the claimant vehicle are required before presenting the claims adjustor with the additional questions.

19. The system of claim 16, wherein the system further comprises a generation engine operable to generate the additional questions when the initial negligence allocation allocates all negligence to the insured vehicle and the type of accident is one of: a failure to yield right of way, backing, lane change, or rear end.

20. The computer-implemented method of claim 1, further comprising enabling a capability to take a voice recording in response to receiving an indication of a first type of accident.

* * * * *